Jan. 2, 1968  E. S. BABSON  3,361,083
CONVEYOR SYSTEMS
Filed June 9, 1965  7 Sheets-Sheet 1

*Inventor*
Edward S. Babson
By his Attorney
Robert E Ross

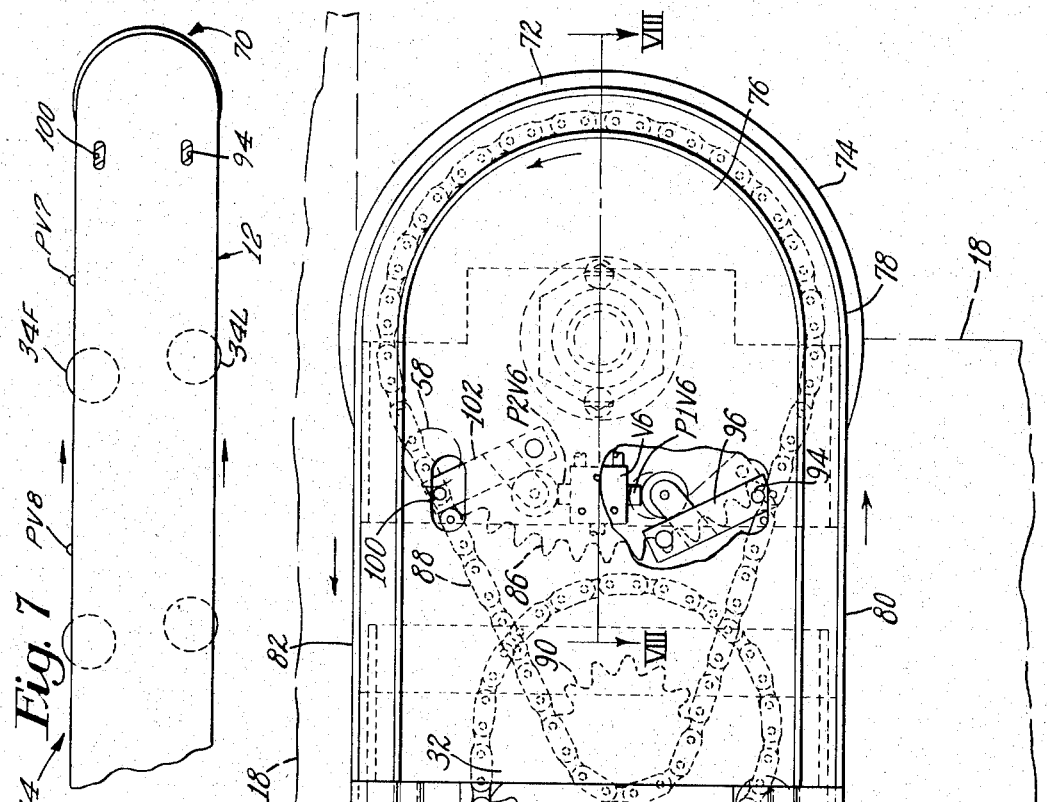
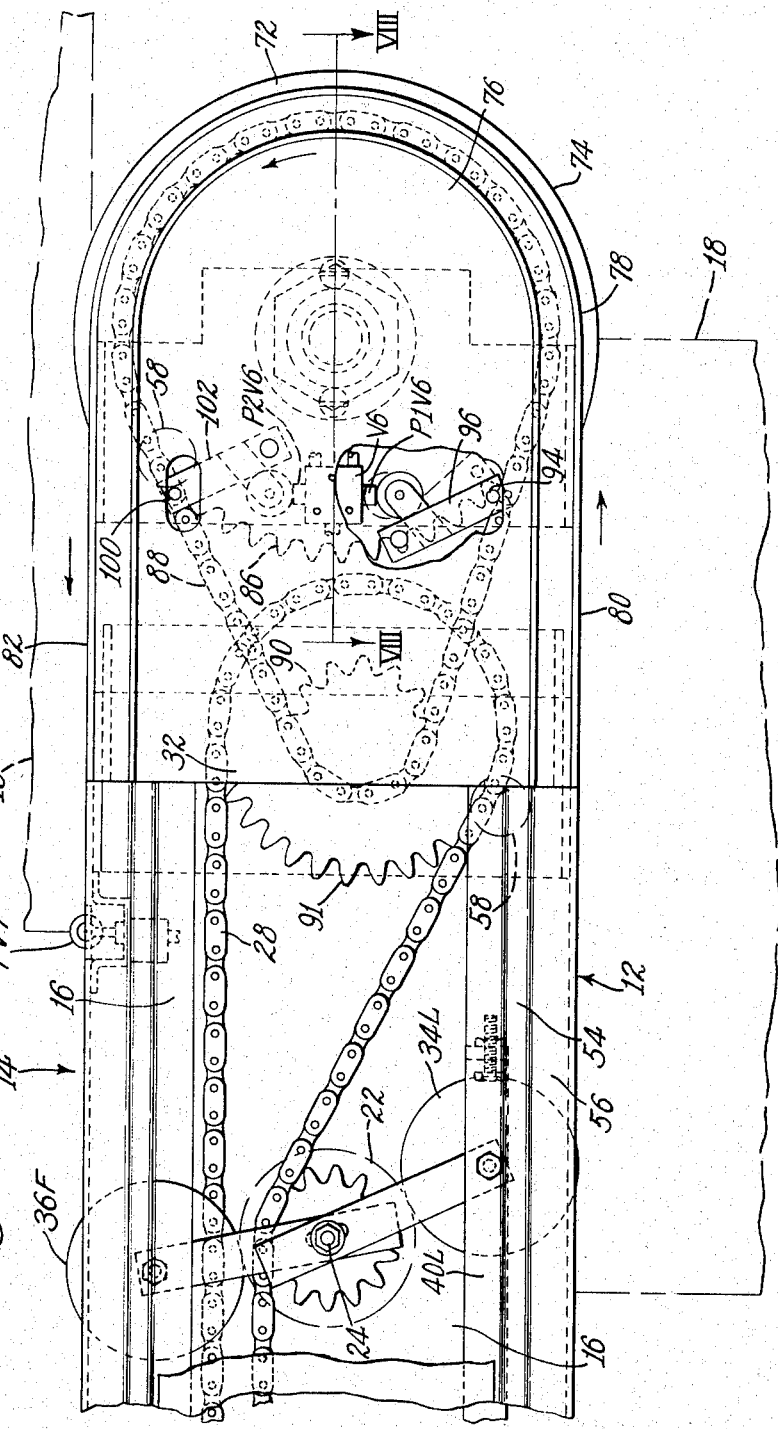

Jan. 2, 1968  E. S. BABSON  3,361,083
CONVEYOR SYSTEMS
Filed June 9, 1965  7 Sheets-Sheet 5

Jan. 2, 1968  E. S. BABSON  3,361,083
CONVEYOR SYSTEMS

Filed June 9, 1965  7 Sheets-Sheet 6

Jan. 2, 1968  E. S. BABSON  3,361,083
CONVEYOR SYSTEMS
Filed June 9, 1965  7 Sheets-Sheet 7

United States Patent Office 3,361,083
Patented Jan. 2, 1968

3,361,083
CONVEYOR SYSTEMS
Edward S. Babson, Ipswich, Mass., assignor to United Shoe Machinery Corporation, Flemington, N.J., a corporation of New Jersey
Filed June 9, 1965, Ser. No. 462,604
10 Claims. (Cl. 104—168)

ABSTRACT OF THE DISCLOSURE

A conveyor system in which article carriers are releasably held against powered friction wheels which supply the motivating force to the article carriers. The friction wheels are designed to be retracted to a position whereat they are removed from contact with the article carriers allowing control over the movement of the article carriers.

---

This invention relates generally to conveyor systems of the type in which article carrying racks are moved between work stations by a conveying mechanism, and has particular reference to such a system in which novel means is provided for driving and for controlling the movement of the racks.

In Patent 3,130,685, issued April 28, 1964, there is disclosed an article handling system comprising individual racks which are adapted to be moved between work stations by a floor mounted conveyor chain. The racks are each provided with a towing mechanism for engagement by the chain, and rack arresting stop mechanisms are provided alongside the chain at each work station and at other predetermined positions to form rack pooling stations.

For reasons of safety, provision is also made for effecting automatic release of the rack from the driving chain if the rack collides with a person or other object. In the device disclosed in the above-identified patent a bumper is provided on the forward end of the rack, said bumper being so connected to the towing mechanism as to cause disengagement thereof from the chain when the bumper encounters an obstruction.

Although the bumper device disclosed in the above-identified patent has been found to operate satisfactorily, it increases the cost of the rack and is subject to damage during handling of the racks when they are away from the conveyor. In some installations it is desirable that the rack be capable of traveling in both directions, in which case a bumper on both ends of the rack is required. The cost of the rack and the susceptibility to damage are thereby increased.

An object of this invention is to provide a conveyor system in which article carrying devices are driven by a series of individual drive wheels mounted along a predetermined path.

A further object of the invention is to provide a conveyor system in which means is provided for rendering one or more of said drive wheels inoperative to stop an article carrying device at a desired position.

A further object of the invention is to provide a conveyor system in which a series of drive wheels are mounted in a predetermined path and means is associated with said drive wheels for releasably maintaining an article carrying device in operative relation to said drive wheels.

A further object of the invention is to provide a conveyor system having a series of individual drive wheels for propelling an article carrying device along a predetermined path in which means is provided for automatically rendering predetermined sets of drive wheels inoperative to control the movement of said driver along said path.

Other objects of the invention will be apparent to one skilled in the art from the following detailed description of a specific embodiment thereof.

Figure 1:
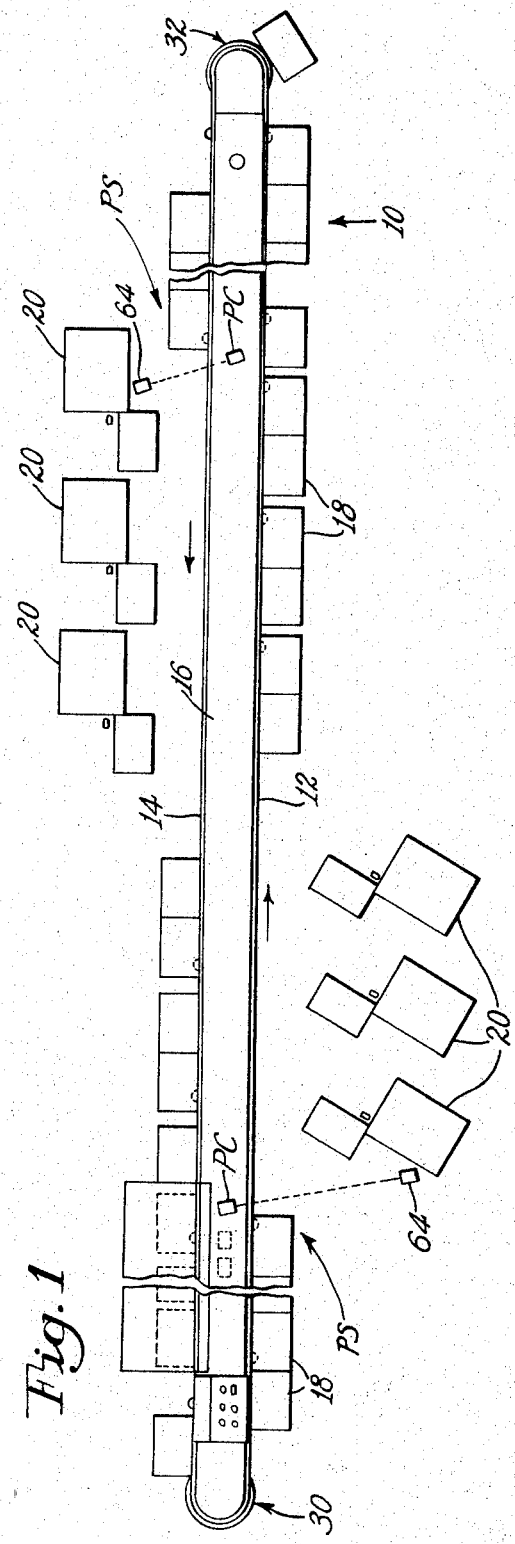
Figure 2:
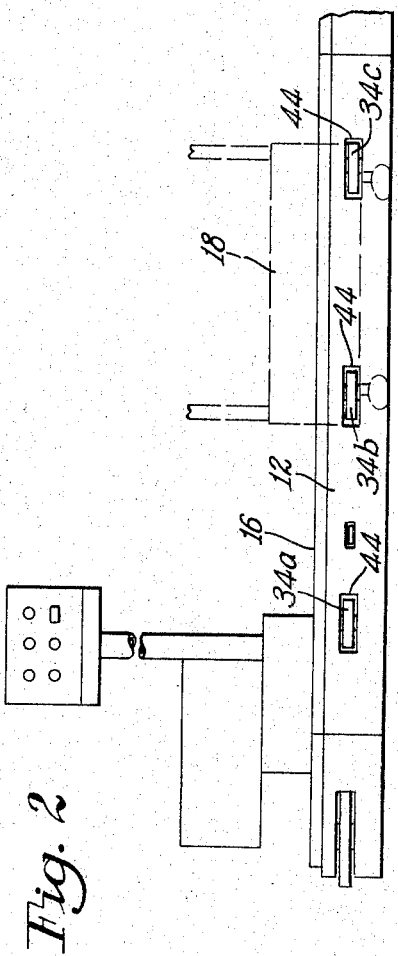
Figure 3:
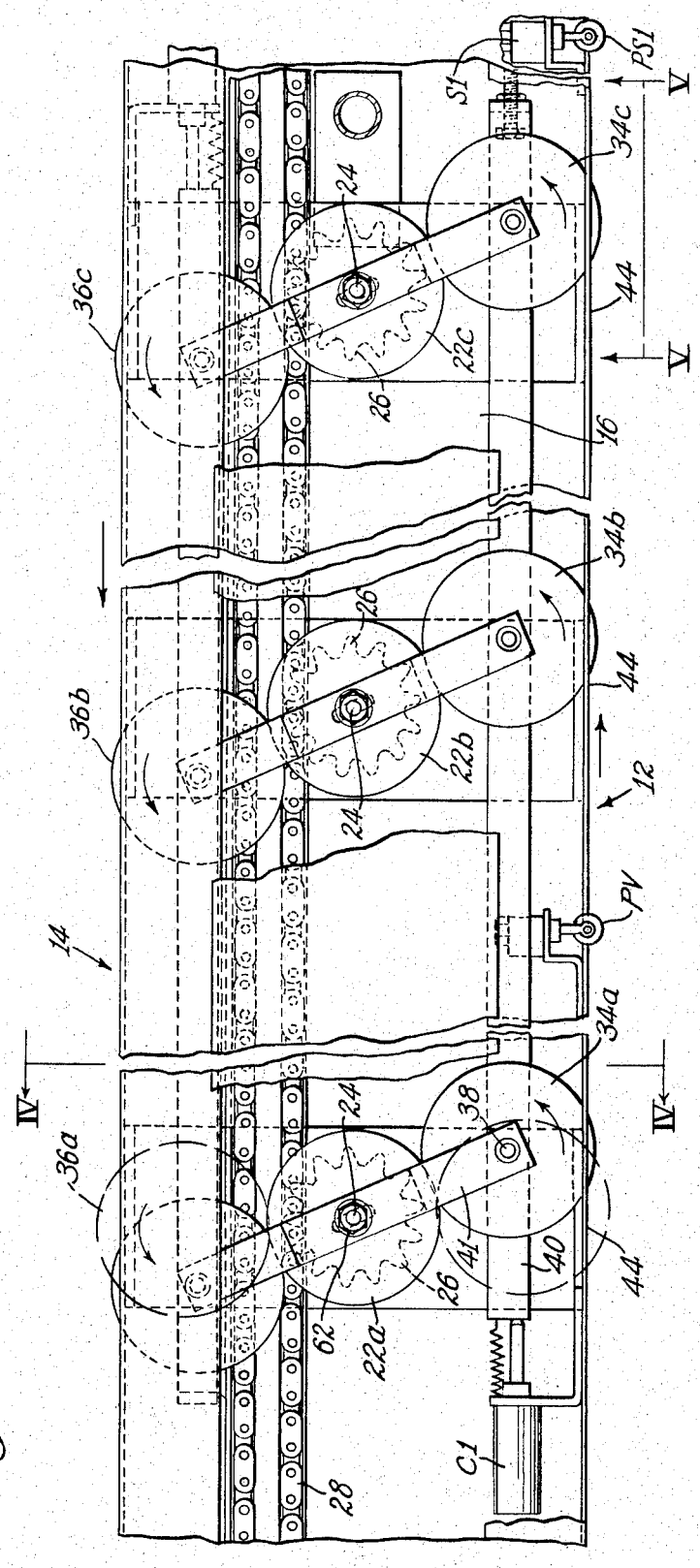
Figure 4:
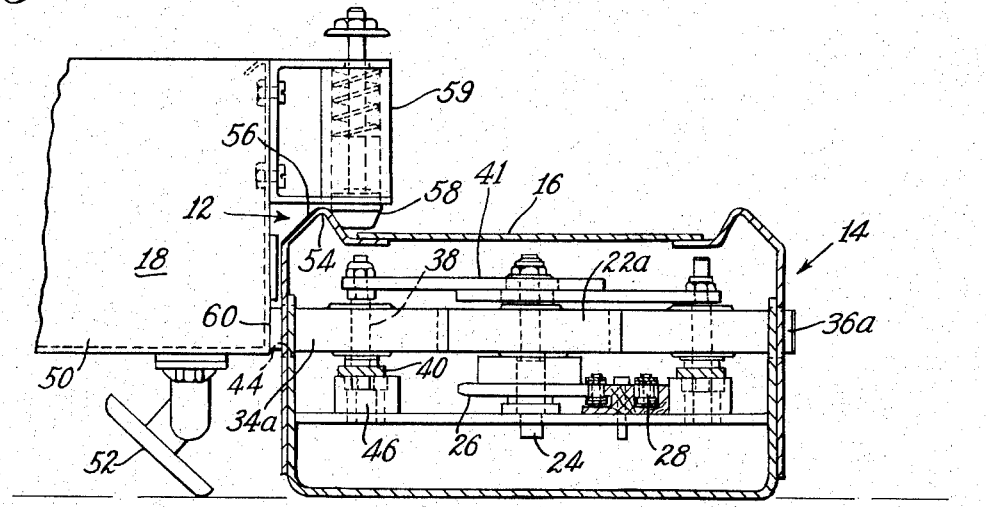
Figure 5:
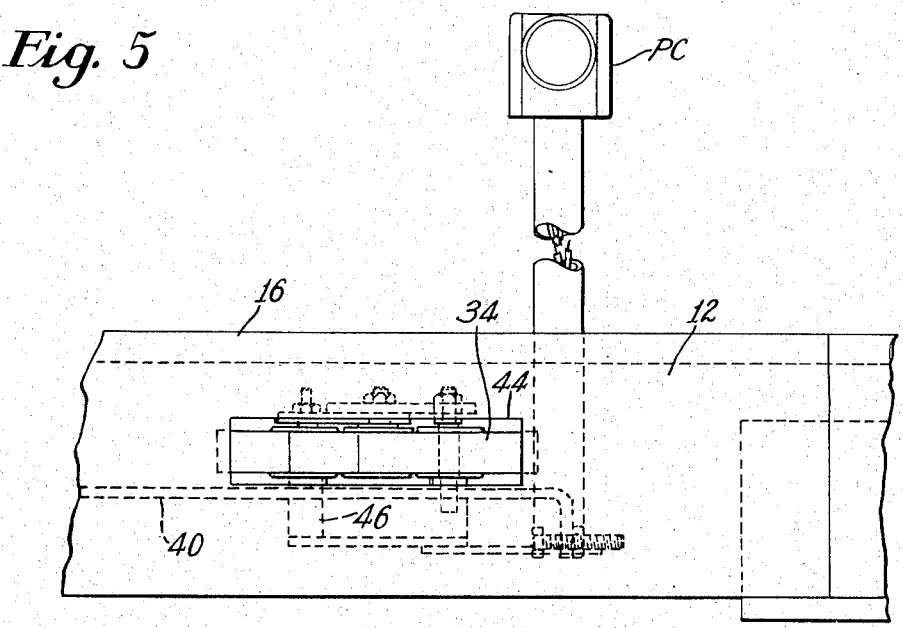
Figure 8:
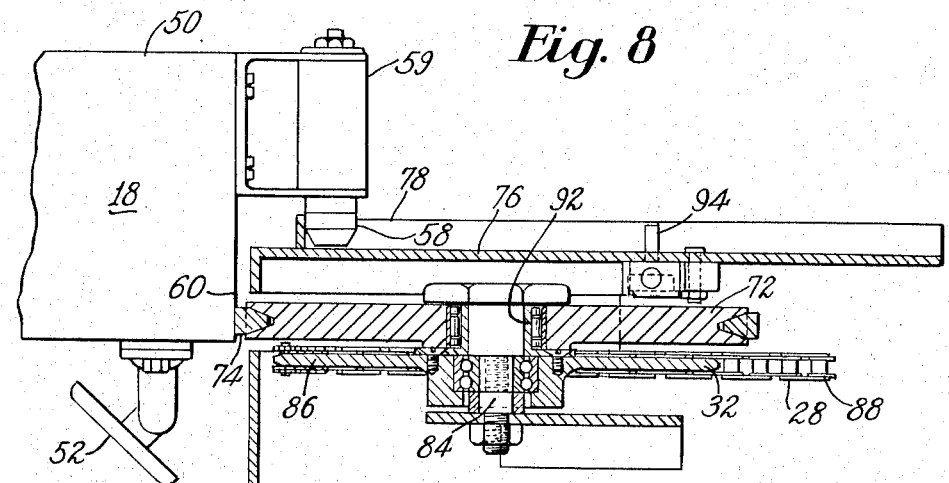
Figure 12:
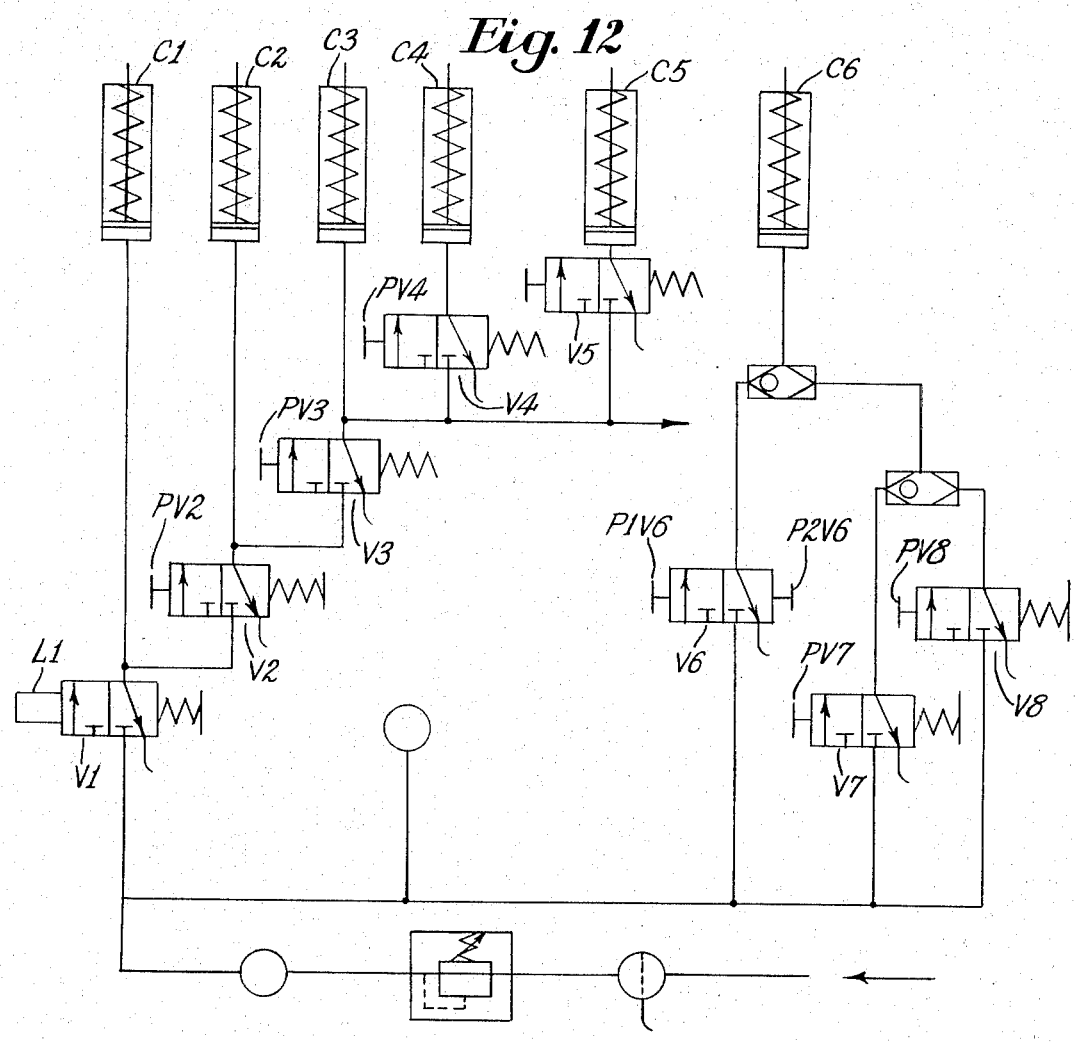
Figure 9:
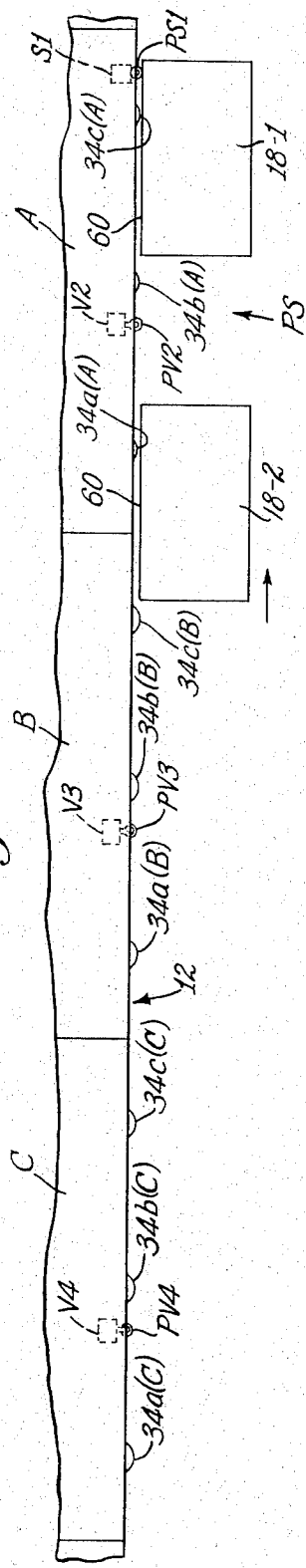
Figure 10:
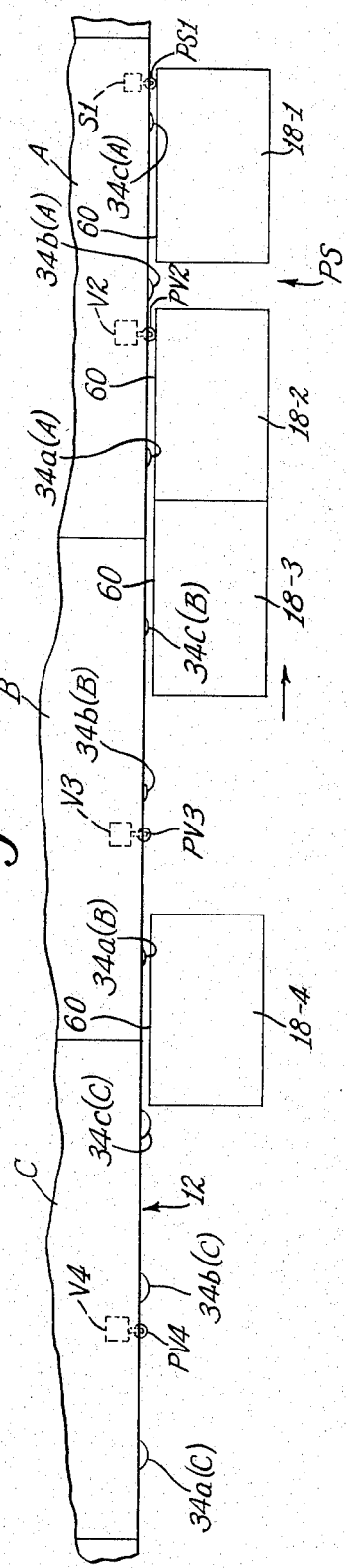
Figure 11:
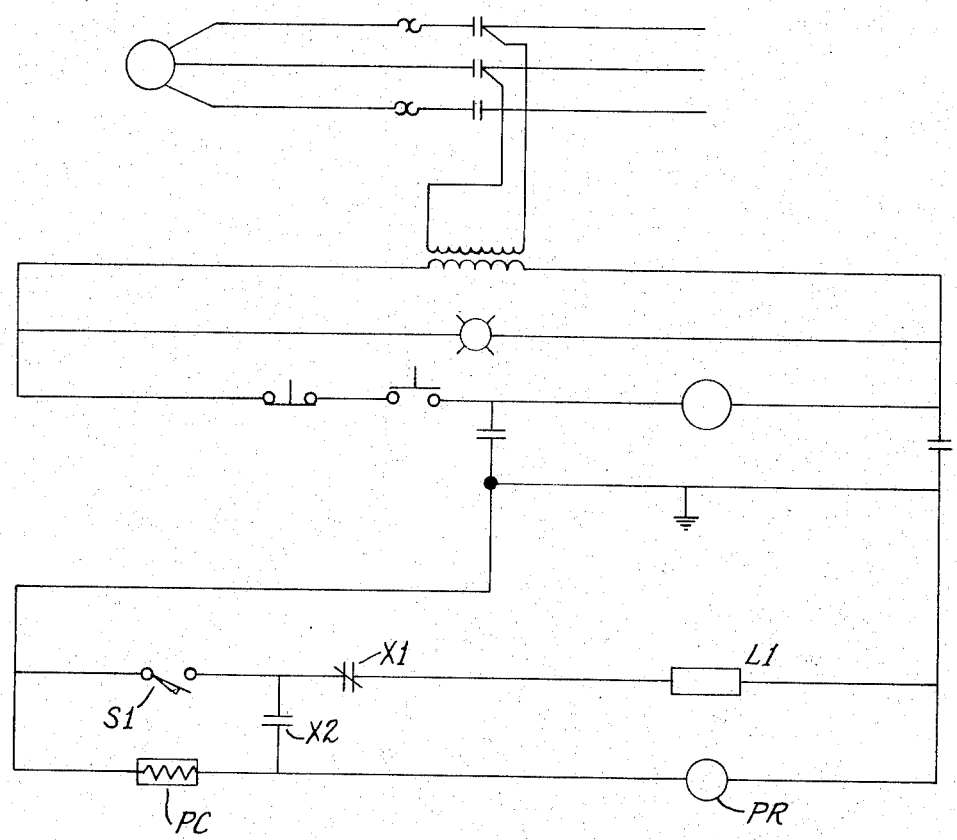

In the drawings:
FIG. 1 is a schematic plan view of a conveyor system embodying the features of the invention;
FIG. 2 is an elevation view of a portion of the conveyor of FIG. 1 as seen from the right side;
FIG. 3 is a top plan view of a section of the conveyor of FIG. 1 on an enlarged scale;
FIG. 4 is a view in section taken on line IV—IV of FIG. 3, with a rack disposed in operative relation to the conveyor;
FIG. 5 is a view taken on line V—V of FIG. 3;
FIG. 6 is a top plan view of one end of the conveyor illustrating the mechanism for transferring the racks around said end;
FIG. 7 is a schematic plan view of the end of the conveyor having the transfer mechanism, illustrating the position of rack detecting mechanism for controlling the movement of racks into the transfer mechanism;
FIG. 8 is a view in section taken on line VIII—VIII of FIG. 6, with a rack disposed in operative relation thereto;
FIGS. 9 and 10 are schematic plan views showing the manner of controlling the movement of racks approaching the pool position;
FIG. 11 is a schematic diagram of the electrical system of the conveyor; and
FIG. 12 is a schematic diagram of the pneumatic system of the conveyor.

Referring to the drawing, there is illustrated a conveyor system 10, which comprises a pair of conveyor runs 12 and 14 disposed on opposite sides of an elongated housing 16.

The conveyor runs are adapted to move article carrying devices such as shoe racks 18 between positions on the conveyor runs opposite work stations 20, so that operators at the work stations can remove appropriate racks from the conveyor for performing predetermined operations on the shoes carried thereby, and return them into operative relation with the conveyor when the operation is completed.

To provide means for driving the racks 18 along the conveyor a plurality of driving wheels 22a, 22b, 22c, etc. are centrally disposed in the housing 16 (see FIG. 3), each wheel 22 being mounted on a vertical shaft 24 which also carries a sprocket 26. A drive chain 28 extending the length of the housing engages each sprocket 26, passes around a driving sprocket 30 at a driving end of the conveyor and around an idler sprocket 32 at the opposite end of the conveyor.

Associated with the drive wheels 22a, 22b, 22c, etc. are rack drive wheels 34a, 34b, 34c, etc. on the side of the outgoing run 12, and rack drive wheels 36a, 36b, 36c on the side of the incoming run 14. The method of mounting and of operation of the drive wheels on both sides of the conveyor is the same hence only the operation of the drive wheels on the outgoing run 12 will be described in detail.

Each rack drive wheel 34 is mounted on an axle 38 (FIG. 4), the lower end of which is mounted on a link bar 40, the upper end being connected to a pivot arm 41 extending from the shaft 24 of the center drive wheel. Disposed opposite each rack drive wheel in the side wall 42 of the housing is an aperture 44 which is horizontally elongated to permit the wheel to project therethrough as will appear hereinafter.

The link bar 40 rests on suitable support blocks 46, so as to be slidable thereon in a direction parallel to the conveyor run under the impetus of a pneumatic cylinder C1.

The link bar 40 enables the rack drive wheels connected thereto to be pivoted about the axes of the central drive wheels 22 (see FIG. 3) between a first position (shown in phantom line) in which the rack drive wheels project through the aperture 44 into a rack driving position, and a second position (shown in full line) in which the rack driving wheels pivot in a generally downstream direction and thereby move inwardly out of the rack driving position.

In the illustrated embodiment of the invention each link bar 40 has three rack driving wheels connected thereto so that the rack driving wheels are moved into and out of rack driving position of groups of three, and the spacing between adjacent wheels is less than the length of a rack to be driven thereby, both for a purpose to appear hereinafter.

In the illustrated embodiment the racks 18 each comprises a base 50 (FIG. 4) supported by casters 52 angularly mounted thereon to enable the rack to be moved freely in any direction. Any suitable means (not shown) may be disposed on the base for carrying articles on which operations are to be performed at the work stations. To provide means for releasably maintaining the racks in the proper position in relation to the drive wheels the housing 16 is provided with a guide ridge or shoulder 54 extending along each side; with an outwardly and downwardly inclined cam surface 56 leading to the shoulder. The racks 18 are each provided with a spring-loaded detent 58 mounted in a suitable housing 59 on the side adjacent the conveyor, said detent being positioned at a suitable height such that when the rack is moved into operative relation to the conveyor by being pushed sideways toward its housing, the detent 58 rides up the surface 56 and snaps over the shoulder 54. When the rack has been so engaged with the housing, the side 60 of the base 50 adjacent the housing is in position to bear against the drive wheels 34, 34a, etc., when said wheels are projecting through the apertures 44 in the rack driving position. Referring to FIG. 3 it will be noted that the rack drive wheels in the illustrated embodiment, rotate in a counterclockwise direction as seen from above so that the portion of the wheel periphery projecting through the housing aperture moves in the direction which it is desired that the racks move. It will also be noted that when the rack drive wheels are in the extended or driving position the axis of the rack drive wheel is slightly downstream from the axis of its center drive wheel. The forward force imparted to the rack by the drive wheel results in a backward force against the wheel, which tends to cause the wheel to pivot clockwise around the center drive wheel 22. Since such pivoting movement would cause the drive wheel to project further out from the housing, a wedging action results which insures good frictional engagement between the drive wheel and the side of the rack, and also provides compensation for the necessary manufacturing tolerances in the various components. To compensate for wear of the drive wheels and to permit compression thereof, the aperture 62 in pivot arm 41 is elongated to permit automatic adjustment of the inter-axial distance between the center drive wheels and the rack drive wheels.

As illustrated in FIGS. 1, 9 and 10, the conveyor system is adapted to transfer racks 18 between work stations 20 disposed along both sides of the conveyor, and for this purpose means may be provided for pooling racks at pooling stations PS positioned upstream from each group of work stations, and means is provided to enable an operator at a work station to release a rack from the pool station associated therewith. Means is also provided for controlling the movement of the racks approaching the pool station, so that the rack waiting at the pool station is not pushed ahead by following racks.

Referring to FIGS. 9 and 10 there is illustrated a group of conveyor sections designated A, B and C, each section including three central drive wheels and three rack drive wheels associated therewith on each side of the conveyor.

Associated with the conveyor sections A, B and C are valves V2, V3 and V4, respectively, actuated by plungers PV2, PV3 and PV4 respectively which project outwardly into the path of a rack moving along the outgoing run of the conveyor. In the illustrated embodiment each plunger is positioned just upstream from the center drive wheel for a purpose to appear hereinafter. Conveyor section A, which is to serve as a pool station is also provided with a switch S1 (FIG. 11) having an operation plunger PS1, projecting into the path of a rack traveling on the outgoing run near the downstream end of said section. Switch S1 and the valves V2, V3 and V4 control the actuation of pneumatic cylinders C1, C2, C3 and C4 (FIG. 12) associated with the track sections to shift the drive wheels of the sections between the driving and the non-driving position as previously described.

When a first rack 18-1 reaches the position shown in FIG. 9 so that the switch S1 is closed by the front edge of the rack striking PS1 solenoid L1 (see FIG. 12) is energized to shift valve V1 (see FIG. 12) to admit air to cylinder C1 to retract the driving wheels 34a(A), 34b(A) and 34c(A) of conveyor section A. The rack 18-1 thereby stops in the position shown (in FIG. 9). The next following rack 18-2 stops when the rear edge of the side 60 of the rack base leaves the last drive wheel 34c(B) of the conveyor section B. In this position, the front edge of the rack base has not yet reached the plunger PV2, so that the drive wheels of conveyor section B continue to operate. When a third rack 18-3 reaches the position of the second rack, being driven by the drive wheels of conveyor section B, it pushes rack 18-2 ahead until it strikes plunger PV2 (see FIG. 9), thereby shifting valve V2, actuating cylinder C2 to retract the drive wheels of conveyor section B so that racks 18-2 and 18-3 stop in the position indicated in FIG. 10.

When a fourth rack 18-4 arrives at conveyor section B, it stops when the rear edge of its side 60 leaves the last drive wheel 34c(C) of conveyor section C. A subsequently arriving rack will push rack 18-4 forwardly to strike plunger PV3 and retract the drive wheels of conveyor section C in the manner previously described in connection with conveyor section B.

Means is provided for enabling an operator at a downstream work station to release the leading rack at a pool station PS so that the rack is conveyed to said station. In the illustrated embodiment said means comprises a photocell PC and a photocell relay PR (FIG. 11). Operator controlled light producing means 64 (FIG. 1) may be provided at a work station 20 to illuminate the cell PC to cause it to become sufficiently conductive to energize relay PR, which opens contact X1 to deenergize solenoid L1 and closes contact X2 to create a holding circuit to relay PR. When solenoid L1 is deenergized valve V1 returns to its original position, allowing cylinder C1 to extend the drive wheels of conveyor section A. Racks 18-1 and 18-2 thereby move forwardly. When rack 18-1 has passed beyond PS1, switch S1 opens, deenergizing relay PR, so that contact X1 returns to the closed position, and contact X2 returns to the open position. When the rear edge of rack 18-2 passes beyond plunger PV2, valve V2 is returned to its original position to allow cylinder C1 to extend the drive wheels of conveyor section B, and when the front edge of rack 18-2 reaches plunger PS1, the drive wheels of section A are again retracted in the manner previously described. When the drive wheels of section B are extended rack 18-3 moves forwardly until the rear edge thereof leaves drive wheel 34c(B), so that racks 18-2 and 18-3 now temporarily occupy the position previously occupied by racks 18-1 and 18-2 respectively as shown in FIG. 9. The drive wheels of section B also move rack 18-4 forwardly to push rack 18-3 forwardly until it depresses plunger PV2 which again retracts the drive wheels of Section B. Following racks move forwardly in a similar manner.

Referring to FIG. 12, it will be noted that the cylinders C1–C4 are connected in cascade through valves V1–V4 so that cylinders C2–C4 cannot be pressurized unless the preceding cylinders are pressurized. Hence as a rack approaches the pool station PS, depressing plungers PV4, PV3, PV2 and PS1 in succession, no retraction of the drive wheels of the conveyor sections occurs until the rack strikes PS1. Similarly as rack 18–2 travels toward rack 18–1 only valve V2 is pressurized so that the depressing of the plungers PV3 and PV4 does not cause the retraction of the drive wheels of the preceding section. Unnecessary wear on the drive wheel operating mechanism is thereby avoided. In case there is insufficient air supply to operate all of the cylinders in the cascade arrangement, cylinders of conveyor sections further upstream may be connected in parallel with the last cylinder in the cascade series, as for example, cylinders 4 and 5 as shown in FIG. 12.

Referring now to FIGS. 6 to 8 there is illustrated mechanism 70 for transferring racks from the end of the outgoing run 12 to the beginning of the incoming run 14.

Said mechanism comprises a drive wheel 72 having a resilient peripheral portion 74 positioned for driving engagement with the side 60 of a rack approaching the end of the outgoing run 12 of the conveyor before the rear end thereof has passed beyond the last drive wheel. A cover plate 76 (FIG. 8) is disposed over the wheel, the outer edge of said plate having a retaining rim with a semi-circular portion 78 which is concentric with the drive wheel and spaced slightly inwardly from the outer periphery thereof and straight edge portions 80 and 82 extending from the semi-circular portion generally into alignment with the shoulders 54 on the housing 16. The drive wheel 72, mounted on a shaft 84, is driven by a sprocket 86 through a chain 88 from a small sprocket 90 mounted on the same shaft as an idler sprocket 91 so that the periphery of the drive wheel 72 moves at a considerably lower speed than the speed at which the racks are driven by the drive wheels 34. The drive wheel 72 is connected to the shaft 84 through a one-way clutch 92 (FIG. 8) so the drive wheel may be rotated freely counterclockwise in relation to the sprocket for a purpose to appear hereinafter.

When a rack 18 approaches the end of the outgoing run 12, the front edge of the side 60 thereof engages the drive wheel 72. Since the speed of the rack is greater than the peripheral speed of the drive wheel, the drive wheel is rotated by the rack counterclockwise in relation to the sprocket 86 until the rear edge of the rack passes the last rack drive wheel, designated 34L in FIG. 6. The detent 58 on the rack also passes from behind the shoulder 54 on the conveyor housing to behind the straight portion 80 of the rim so that as the rack is driven forwardly by the drive wheel 72 it is guided around the end of the conveyor by the semi-circular portion of the guide rim until the front edge of the rack contacts the first drive wheel, designated 34F in FIG. 6, on the incoming run of the conveyor. Since the peripheral speed of the wheel 34F is greater than the peripheral speed of the wheel 72, the rack is pulled away from the wheel 72 by the drive wheel 34F so that said wheel 72 again rotates in a counterclockwise direction in relation to the sprocket to permit unimpeded acceleration of the rack to the speed of the drive rolls of the incoming run.

To prevent a second rack from entering the transfer mechanism until the first rack has been discharged therefrom, means is provided for moving the three rack drive wheels just preceding the transfer mechanism to the retracted position as a rack enters the transfer mechanism and for maintaining them in the retracted position until the rack has passed a predetermined point on the incoming run. As a rack 18 enters the transfer mechanism, the detent 58 on the rack strikes a pin 94 on a lever 96, which pivots said lever to depress the plunger P1V6 of valve V6 to shift said valve to the opposite position to pressurize cylinder C6, thereby actuating the link bar 40L to retract said last three drive wheels. To provide means for maintaining pressure on the cylinder C6 until the rack has left the transfer mechanism and has passed a predetermined point on the incoming run, valves V7 and V8, connected in parallel with valve V6 are provided with operating plungers PV7 and PV8 positioned along the incoming run to be depressed as the rack passes. Plunger PV7 is disposed at a distance from the transfer mechanism such that it is depressed by the front end of the rack as the rack leaves the transfer mechanism thereby shifting valve V7, just before the detent 58 of the rack strikes a pin 100 on a lever 102, which depresses plunger P2V6 to shift valve V6 back to its original position. Although pressure to cylinder C6 through valve V6 is thereby shut off, pressure to said cylinder is now maintained through valve V7. Operating plunger PV8 of valve 8 is positioned downstream from plunger PV7 less than the length of the rack base, so that the front end of the rack depresses said plunger to shift valve V8 to admit pressure to cylinder C6 through said valve before the rear end of the rack passes beyond plunger PV7, allowing valve V7 to return to the original position. After the rack has moved far enough along the incoming run 14 so that the rear end thereof passes beyond plunger PV8 (FIG. 7), valve V8 returns to its original position, so that cylinder C6 is no longer pressurized, thereby allowing the drive wheels just upstream from the transfer mechanism to be again extended to convey another rack into the transfer mechanism.

Although in the illustrated embodiment the conveyor sections consist of three rack drive wheels on each side of the housing, in some applications the drive wheels may be operated individually. Means other than pneumatic cylinders may be utilized to shift the drive wheels between the retracted and extended position.

Since certain other changes may be made in the device without departing from the scope of the invention, it is intended that all matter contained herein be interpreted in an illustrative and not a limiting sense.

Having thus described my invention, what I claim as new and desire to secure by Letters Patent of the United States is:

1. A conveyor system, adapted to transfer article carrying devices between work stations, said system comprising an elongated housing having a series of driving wheels spaced therealong, and a retaining track for engagement with an article carrying device to retain said device in operative relation to the driving wheels, said wheels being normally positioned for driving engagement with an article carrying device engaged with said retaining track and being movable out of the driving position in response to the presence of an article carrying device at a predetermined position along said track.

2. A conveyor system adapted to transfer article carrying devices along a predetermined path comprising a series of first drive wheels and a second drive wheel assciated with each of said first drive wheels and positioned to be driven thereby, a retaining track positioned in relation to said second drive wheels to retain an article carrying device in operative relation to said second drive wheels so that said device is driven along said track by said second drive wheels, the axis of each of said second drive wheels being positioned slightly downstream from the axis of the first drive wheel associated with it, whereby the forward force imparted to the article carrying device causes a rearward force to be imparted to the second drive wheel to cause it to have a wedging action between the article carrying device and the first drive wheel.

3. A conveyor system adapted to transfer article carrying devices along a predetermined path, comprising a series of drive wheels mounted within an elongated housing and disposed along said path for driving engagement with an article carrying device, said wheels being spaced apart a distance slightly less than the length of the portion of the article carrying device engaged thereby, and means for retracting groups of adjacent drive wheels to a non-driving position.

4. A conveyor system adapted to transfer article carrying devices along a predetermined path, comprising a series of drive wheels disposed along said path for driving engagement with an article carrying device, said wheels being spaced apart a distance slightly less than the length of the portion of the article carrying device engaged thereby, means for retracting said drive wheels in groups of three adjacent wheels, and means disposed along said path positioned for actuation by an article carrying device to operate said means for retracting said drive wheels.

5. A conveyor system adapted to transfer article carrying devices along a predetermined path, comprising a series of drive wheels disposed along said path for driving engagement with an article carrying device, said drive wheels being spaced apart a distance slightly less than the length of the portions of the article carrying device engaged thereby, means for retracting said drive wheels to a non-driving position in groups of three adjacent wheels, and actuating means associated with each of said groups positioned for operation by an article carrying device to cause retraction of the next upstream group of drive wheels.

6. A conveyor system as set out in claim 5 in which wheel and the upstream drive wheel of each group of said actuating means is disposed between the middle drive three adjacent wheels.

7. A conveyor system for transferring article carrying devices between work stations, comprising a first run for carrying devices in one direction and a second run extending from the end of the first run and in a different direction, said runs each having a plurality of drive elements normally disposed in an extended position for driving engagement with an article carrying device and being retractable to a non-driving position, transfer means adapted to transfer articles from the end of the first run to the beginning of the second run, first control means responsive to the entry of an article carrying device into the transfer means to cause retraction of at least the last drive element on the first run, and second control means responsive to the discharge of the article carrying device from the transfer means to permit said last drive element to return to the drive position.

8. A conveyor system as set forth in claim 7 in which third control means is provided for also causing retraction of said last drive element, said third control means being disposed on said second run in such relation to said second control means that it is actuated by an article carrying device before said second control means is actuated.

9. A conveyor system adapted to transfer article carrying devices between work stations, said system comprising a series of individual driving wheels mounted within a housing and spaced apart along a predetermined path, said wheels being movable between a first position in which they extend beyond the housing and are located for driving engagement with an article carrying device disposed in operative relation to said conveyor system and a second position in which they are moved inwardly of said first position and disposed out of the driving engagement position, and means responsive to the presence of an article carrying device in a predetermined position to move at least one driving wheel to the second position.

10. A conveyor system as set out in claim 9 including means disposed along said pre-determined path for releasably engaging an article carrying device to retain it in operative relation to said drive wheels.

References Cited

UNITED STATES PATENTS

| | | | |
|---|---|---|---|
| 3,012,652 | 12/1961 | Poel | 198—127 |
| 3,039,402 | 6/1962 | Richardson | 104—168 |
| 3,171,621 | 3/1965 | Steinbach | 246—182 |
| 3,285,195 | 11/1966 | Babson | 104—252 |

ARTHUR L. LA POINT, *Primary Examiner.*

D. F. WORTH, *Assistant Examiner.*

UNITED STATES PATENT OFFICE
CERTIFICATE OF CORRECTION

Patent No. 3,361,083

January 2, 1968

Edward S. Babson

It is certified that error appears in the above identified patent and that said Letters Patent are hereby corrected as shown below:

Column 7, line 24, cancel "wheel and the upstream drive wheel of each group of" and insert the same before "three" in line 26, same column 7.

Signed and sealed this 13th day of January 1970.

(SEAL)
Attest:

Edward M. Fletcher, Jr.
Attesting Officer

WILLIAM E. SCHUYLER, JR.
Commissioner of Patents